June 23, 1942.     P. E. DE FORD     2,287,233
NUT HOLDER
Filed Jan. 24, 1940

Inventor
Perl E. De Ford,

By Clarence A. O'Brien
and Hyman Berman
Attorneys

Patented June 23, 1942

2,287,233

UNITED STATES PATENT OFFICE 2,287,233

NUT HOLDER

Perl E. De Ford, Twin Falls, Idaho, assignor of one-half to P. H. Detweiler, Twin Falls, Idaho Application January 24, 1940, Serial No. 315,446

1 Claim. (Cl. 81—10)

The present invention relates to new and useful improvements in nut holders and more particularly to a holder for lock nuts and the like.

The primary object of the invention is to provide a holder of the aforementioned character which will securely hold a right hand or left hand threaded nut while the same is being broken free or disengaged.

Another object of the invention is to provide a lock nut holder which be simple in construction, efficient and reliable in use, light in weight and which may be manufactured at low cost.

Still further objects and advantages of the invention will become apparent from a study of the following detailed description, taken in connection with the accompanying drawing, wherein like characters of reference designate corresponding parts throughout the several views, and wherein.

Figure 1:
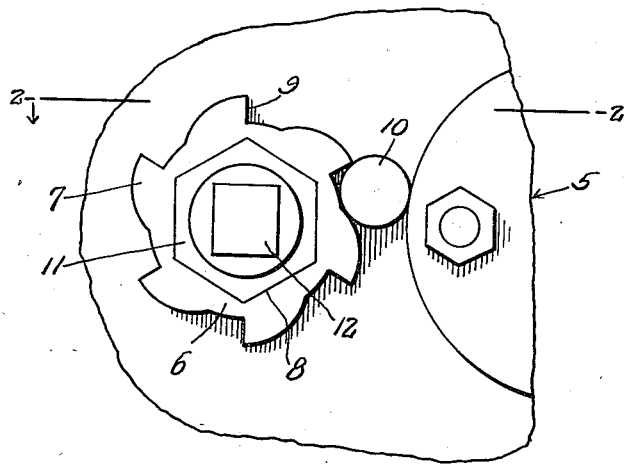
Figure 1 is a fragmentary view of a vehicle wheel showing my invention mounted thereon.
Figure 2:
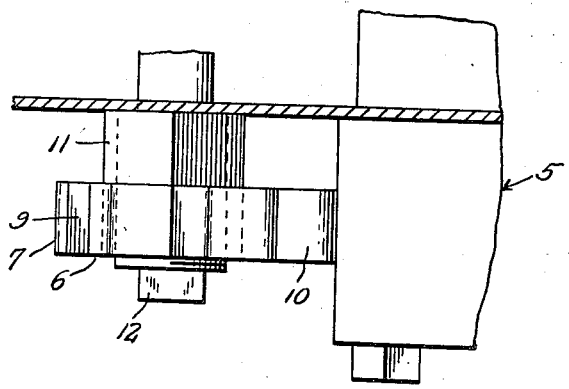
Figure 2 is a top plan view of the invention as applied in Figure 1.
Figure 3:
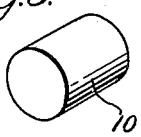
Figure 3 is a perspective view of the chock.

Referring now to the drawing in detail, it will be seen that the reference numeral 5 designates generally a portion of a vehicle wheel with my device shown mounted for operation thereon.

The disk-like nut holder 6 is constructed of suitable metal, and has two substantially parallel flat sides while its periphery has extending therefrom a series of substantially arcuate teeth 7 extending radially therefrom. As shown in Figure 1, the holder 6 has a hexagonal hole 8 therein for placing the same over a nut. One face of each of the arcuate teeth 7 is substantially flat and the surface of such flat face is substantially perpendicular to the side walls of the holder 6 and extends radially from the center thereof as shown at 9.

The chock 10 is constructed from a length of suitable metallic rod.

When the device is used, the nut holder 6 is placed over the lock nut 11 and the chock 10 is seated between two of the arcuate teeth 7 and abutted against a projection as shown in Figure 1. As also shown in Figure 1, the chock 10 is of a diameter to fit part way between said two teeth 7 and to extend radially outwardly of the same a distance greater than the distance between the addendum circle of the teeth and said abutment. When in this position, the bolt 12, or other device held by the lock nut 11, may then be rotated to loosen the lock nut 11 thereon. The holder 6 may be reversed for holding a reversely threaded nut.

Although I have shown and described herein a preferred embodiment of my invention, it is to be definitely understood that I do not desire to limit the application of the invention thereto, and any change or changes may be made in the structure and arrangement of the parts within the spirit of the invention as claimed.

What is claimed is:

A device of the character described for blocking rotation in one direction of a nut frozen on a bolt comprising a disc apertured to fit over said nut in different angular positions and having peripheral teeth thereon, a relatively stationary abutment spaced radially outwardly from said disc, and a removable cylindrical chock insertable between a pair of contiguous teeth and said abutment, said chock fitting part way in between the contiguous teeth and extending radially outwardly of the same a distance greater than the distance between the addendum circle of the teeth and said abutment.

PERL E. DE FORD.